UNITED STATES PATENT OFFICE.

FRANZ SCHOLL, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

YELLOW DYE AND PROCESS OF MAKING SAME.

No. 818,981.     Specification of Letters Patent.     Patented April 24, 1906.

Application filed February 4, 1905. Serial No. 244,173. (Specimens.)

*To all whom it may concern:*

Be it known that I, FRANZ SCHOLL, Ph. D., chemist, a citizen of the Empire of Germany, residing at Höchst-on-the-Main, Germany, have invented certain new and useful Improvements in Yellow Dyes and Processes of Making the Same, of which the following is a specification.

In United States Patent No. 658,593 is described a series of azo dyestuffs derived from aliphatic combining substances, the beta-diketones of the type of the ethyl aceto acetate. These dyestuffs are of a very greenish-yellow shade and may serve as wool or cotton dyestuffs, according to the diazo compound employed for the combination. I have found that yellow mordant dyestuffs may be obtained if beta-diketones of the type in question are combined with the diazo compounds of the ortho-amido salicylic acid and its derivatives and substitution products. While the dyestuffs thus obtained produce on wool in an acid-bath comparatively poor shades, they yield powerful pure yellow lakes if previously mordanted or subsequently treated with metallic salts, especially chromium and copper salts. The copper lakes are chiefly distinguished by their beautiful greenish-yellow shades and properties of fastness, especially to light. Such yellow copper dyestuffs have hitherto not been known. For the manufacture of these dyestuffs are important derivatives of the beta-ketone aldehydes formed by substitution of the aldehyde hydrogen by an alkyl, alphyl, alkyloxy, or anilido group. As examples of this class of bodies, but not including them all, may be mentioned ethyl aceto acetate, acetyl acetone, benzoyl acetone and aceto acetic acid anilid (toluidid and xylid) which may be combined with the diazo compounds of ortho-amido salicylic acid, ortho-amido-para-sulfo salicylic acid, para-nitro-o-amido salicylic acid.

Example I: 15.3 kilograms of ortho-amido salicylic acid are dissolved with thirty kilograms of hydrochloric acid of thirty-per-cent. strength in about three hundred liters of water and diazotised with seven kilograms of sodium nitrite. The suspension of the diazo compounds thus obtained is run, while stirring, into a solution cooled with ice of fifteen kilograms of ethyl aceto acetate, 4.7 kilograms of caustic soda, and twenty kilograms of soda-ash in three hundred liters of water. After standing for several hours the crystalline paste is slowly heated and completely salted out with some common salt. The dyestuff precipitated as crystals is then filtered.

Example II: The solution of twenty-two kilograms of the sodium salt of nitro-ortho-amido salicylic acid and seven kilograms of sodium nitrite in about four hundred liters of water is run, while stirring, into thirty kilograms of hydrochloric acid of thirty-per-cent. strength diluted with three times its quantity of water and ice. The diazo compound separates as crystals. After diazotization the whole suspension is run, while stirring, into a solution cooled with ice of eleven kilograms of acetyl acetone, 4.5 kilograms of caustic soda, and twelve kilograms of soda-ash in about three hundred liters of water. The dyestuff separates as a crystalline brick-red paste. After some time it is heated, salted out with common salt, and filtered.

Example III: 23.3 kilograms of ortho-amido-para-sulfo salicylic acid are dissolved with eight kilograms of caustic soda in about two hundred liters of water. After adding, with stirring, seven kilograms of sodium nitrite the solution is run into thirty kilograms of hydrochloric acid of thirty-per-cent. strength, diluted with some ice and water. The clear solution of the diazo compound is run, while stirring, into a cooled solution of fifteen kilograms ethyl aceto acetate, five kilograms of caustic soda, and ten kilograms of soda-ash, or fifteen kilograms of crystalline sodium acetate in about two hundred liters of water. After some hours the dye solution is slowly heated and salted out. The dyestuff separates as a crystalline yellow powder.

The dyestuffs obtained by this invention are sulfur-yellow to brick-red crystalline powders, readily soluble in water, their aqueous solutions being of a yellow to orange-red tint. On addition of mineral acids the color of the solutions becomes lighter and less intense; on addition of caustic potash, however, darker and browner. In concentrated sulfuric acid the color of the solutions corresponds generally to that of the acidified aqueous solution.

Having now described my invention, what I claim is—

1. The process herein described for the manufacture of yellow mordant dyestuffs, which consists in reacting on aliphatic beta-diketones with diazo compounds of the ortho-amido salicylic acid.

2. The process herein described for the manufacture of a yellow mordant dyestuff, which consists in causing the diazo compound of ortho-amido-sulfo salicylic acid to react on ethyl aceto acetate.

3. As new products the mordant dyestuffs obtained by combining diazotized ortho-amido salicylic acid or its substitution products with aliphatic beta-diketones, being sulfur-yellow to brick-red crystalline powders, soluble in water with yellow to orange-red color, soluble in concentrated sulfuric acid, insoluble in alcohol and petroleum ether; the aqueous solution becoming lighter on addition of mineral acid, but darker on addition of alkali.

4. As a new product, the yellow mordant dyestuff having the formula:

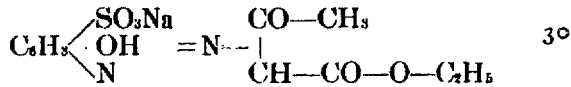

obtained by the action of the diazo compound of ortho-amido-para-sulfo salicylic acid on ethyl aceto acetate, being a yellow crystalline powder, readily soluble in water with a yellow color, which on addition of mineral acids becomes lighter, and darker on addition of alkali, soluble in concentrated sulfuric acid with a greenish-yellow color, insoluble in alcohol and petroleum ether.

In testimony that I claim the foregoing as my invention I have signed my name in presence of two subscribing witnesses.

FRANZ SCHOLL.

Witnesses:
ALFRED BRISBOIS,
JOHANN HARTENSTEIN.